Sept. 13, 1966        A. J. BERNA        3,271,978
ANGULAR ROTARY DRIVE UNIT
Filed Oct. 18, 1963        2 Sheets-Sheet 1
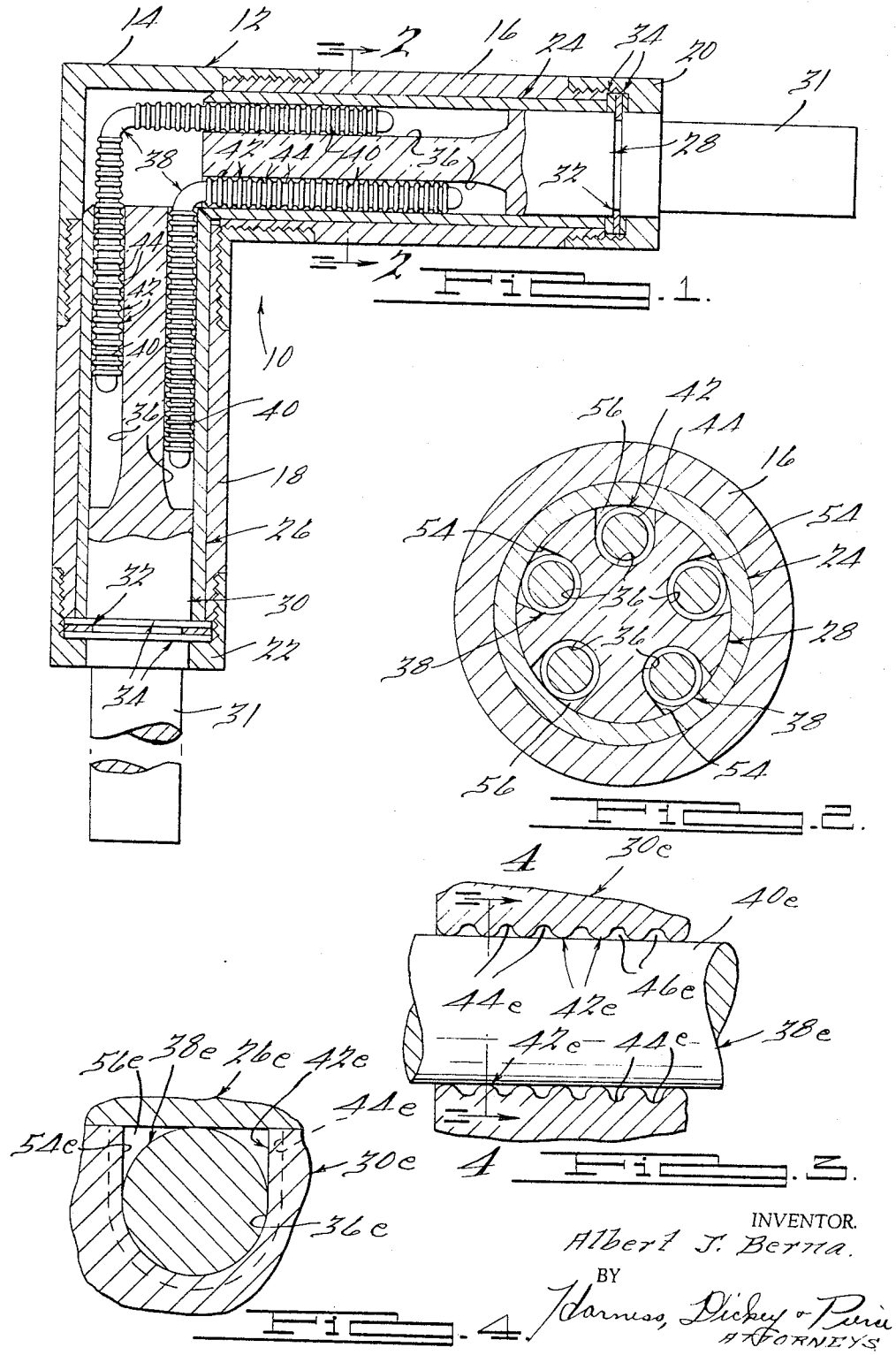
INVENTOR.
Albert J. Berna.
BY
Harness, Dickey & Pierce
ATTORNEYS Sept. 13, 1966 A. J. BERNA 3,271,978
ANGULAR ROTARY DRIVE UNIT
Filed Oct. 18, 1963 2 Sheets-Sheet 2
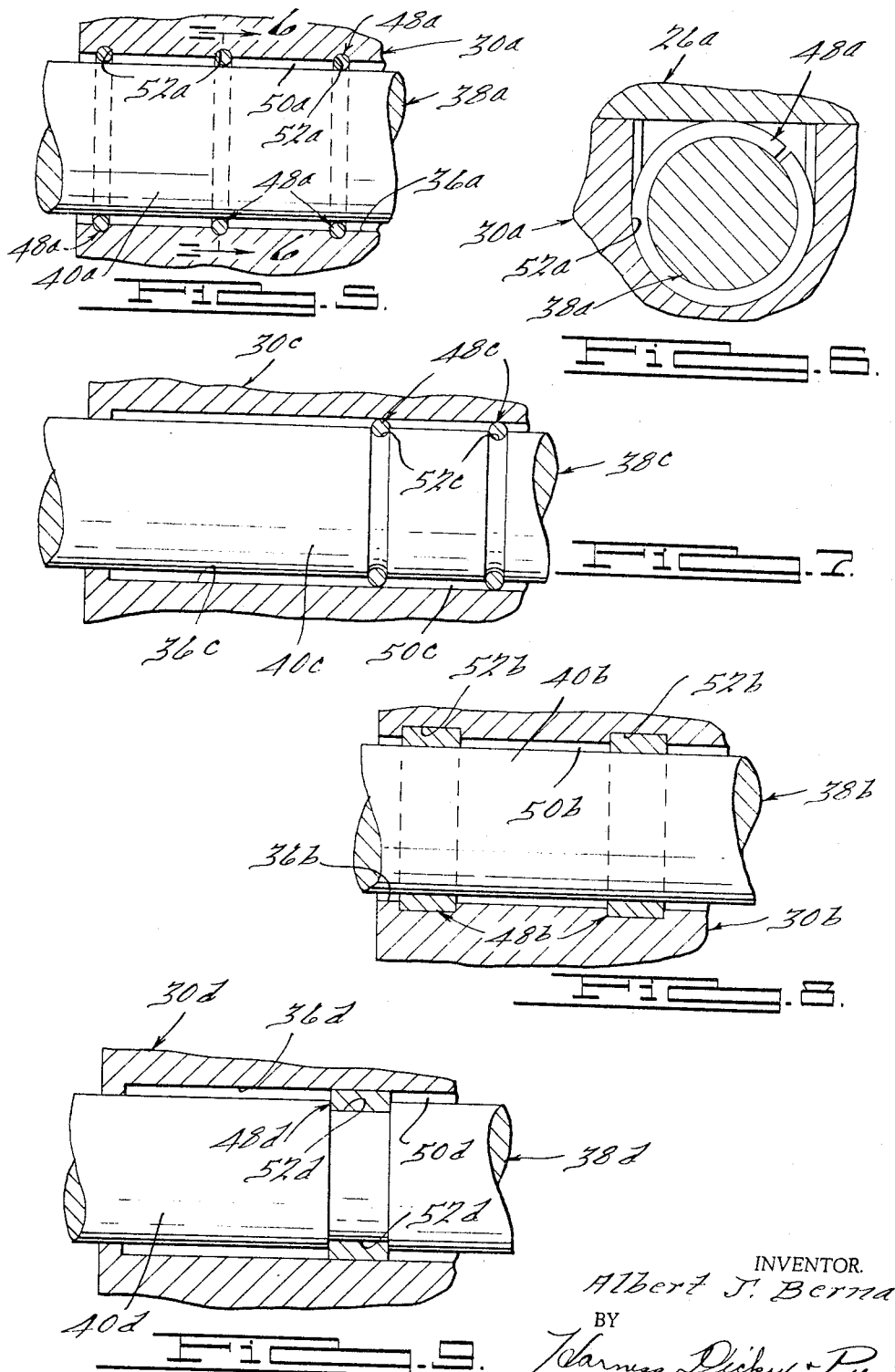
INVENTOR.
Albert J. Berna
BY
Harness, Dickey & Pierce
ATTORNEYS

United States Patent Office 3,271,978
Patented Sept. 13, 1966

3,271,978
ANGULAR ROTARY DRIVE UNIT
Albert J. Berna, 18690 Lauder, Detroit, Mich.
Filed Oct. 18, 1963, Ser. No. 317,353
10 Claims. (Cl. 64—20)

This invention relates generally to means for transmitting rotary power, and more particularly, to an angular rotary drive in which a driving member and a driven member have angularly disposed axes of rotation and are connected by a plurality of angularly configured driving rods.

In my application Serial No. 101,868, filed April 10, 1961, now Patent No. 3,103,799, I have disclosed an angular rotary drive utilizing a pair of angularly related rotor members journaled within a drive housing. The rotors are interconnected by a plurality of orbiting drive pins each having the angularly disposed end portions thereof operatively inserted within one of a plurality of axially extending slots or recesses formed in each of the rotor members so that upon the transmission of rotary power through the drive unit, the end portions of the drive pins reciprocate within their respective slots or recesses.

The construction disclosed herein comprises a modification of the assemblage referred to in the above mentioned application and which, under certain operating conditions, will provide improved performance characteristics. In particular, the construction of the present invention is believed to substantially reduce the frictional energy losses between the rotor members and their interconnecting drive pins and thus improve the overall efficiency of the unit. Accordingly, the provision of such an angular drive unit having improved frictional characteristics, constitutes a primary object of the present invention.

It is another object of the present invention to provide an improved angular rotary drive unit of the above character having a plurality of annular bearing rings interposed between the adjacent bearing surfaces of the angular drive pins and the rotor members to improve the heat dissipating and wear resisting characteristics thereof.

It is another object of the present invention to provide an improved angular rotary drive unit incorporating therein a plurality of angular drive pins and rotor members having a plurality of lubricant chambers interposed between the adjacent bearing surfaces thereof.

Still another object of the present invention is to provide an improved rotary angular drive of a simple design that is easily assembled and economically manufactured.

Other objects and advantages of the present invention will become apparent from the following detailed description taken in conjunction with the accompanying drawings, wherein:

FIGURE 1 is a cross-sectional view of an angular rotary drive illustrating therein an exemplary embodiment of the improvements of the present invention;

FIGURE 2 is an enlarged cross-sectional view of the structure illustrated in FIGURE 1, taken along the line 2—2 thereof;

FIGURE 3 is a fragmentary cross-sectional view of a drive pin and rotor member illustrating another embodiment of the improvements of the present invention;

FIGURE 4 is a fragmentary cross-sectional view taken substantially along the line 4—4 of FIGURE 3;

FIGURE 5 is a fragmentary cross-sectional view similar to FIGURE 3 illustrating still another embodiment of the improvements of the present inventon;

FIGURE 6 is a fragmentary cross-sectional view taken substantially along the line 6—6 of FIGURE 5;

FIGURE 7 is a fragmentary cross-sectional view of a further embodiment of the improvements of the present invention;

FIGURE 8 is a fragmentary cross-sectional view of a still further embodiment of the improvements of the present invention; and FIGURE 9 is a fragmentary cross-sectional view of yet another embodiment of the improvements of the present invention.

Referring to FIGURE 1 of the drawings, an angular rotary drive 10, incorporating an exemplary embodiment of the improvements of the present invention therein, includes a housing 12 having a central elbow portion 14, sleeve portions 16 and 18, and end cover members 20 and 22. The sleeve portions 16 and 18 are respectively provided with sleeve bearings 24 and 26 for rotatably supporting identical rotor members 28 and 30. The angle at which the axes of rotation of the rotor members 28 and 30 are disposed to each other may vary anywhere between 90° and 180°, however, the particular drive unit herein illustrated is designed to operatively connect rotating elements having their axes of rotation disposed in a a right-angle relationship and, accordingly, the axes of rotation of the rotor members 28 and 30 are similarly arranged. A cylindrical shaft portion 31 is integrally formed on each of the rotor members 28 and 30, and rotary power is intended to be supplied to one shaft portion 31 for delivery to the other of said portions through the drive unit 10, in a manner hereinafter to be described.

As illustrated in FIGURE 1, the elbow portion 14, sleeve portions 16 and 18, and end cover members 20 and 22 are each provided with threaded reduced thickness end portions which permit the housing 12 to be easily assembled, and when assembled, to have relatively smooth internal and external walls.

Each of the rotor members 28 and 30 is provided with a snap-ring 32 operatively secured within the drive housing 12 by a pair of thrust washers 34 and adapted to preclude any axial or linear movement of the rotor members 28 and 30 within their respective sleeve bearings 24 and 26.

As may be seen in FIGURE 2, each of the rotor members 28 and 30 is provided with a plurality of circumferentially spaced peripheral slots 36 which extend in a direction parallel to the axis of rotation of their respective rotors. A plurality of drive pins or torque transmitting elements 38 interconnect the rotors 28 and 30 and are adapted to transmit rotary power supplied to one of the rotor members 28 or 30 to the other of said members. Each of the drive pins 38 is formed from a single straight length of bar stock centrally bent to form two cylindrical end portions 40 disposed in the same angular relationship as the rotor members 28 and 30, which in the present case is 90°. The drive pins 38 are operatively mounted within the housing 12 such that one end portion 40 thereof is disposed within one of the axially extending slots 36 of the rotor 28 while the other end portion 40 thereof is disposed within one of the slots 36 in the rotor 30.

Upon each complete revolution of the rotor members 28 and 30, each drive pin 38 moves both in a direction in which its cylindrical end portions 40 approach the adjacent end walls of their respective slots 36 and also in a direction in which the end portions 40 move away from the end walls of the slots 36. The end portions 40 are accordingly subjected to frictional resistance from the inner surfaces of the slots 36, which resistance can cause over-heating and wear of the drive unit 10 and result in a reduction in the effective power transmitted thereby depending upon the loads involved, the speeds at which the unit is operated and the materials being used.

In accordance with the improvements of the present invention, a plurality of axially spaced annularly extending bearing surfaces are formed between the outer periphery of each of the cylindrical end portions 40 of the drive pins 38 and the inner periphery of each of the slots 36. The bearing surfaces are adapted to both increase the surface area of the adjacent bearing portions of the drive pins 38 and the slots 36 and reduce the actual contact area therebetween, thus considerably less frictional heat is generated upon reciprocation of the drive pins 38 within the slots 36, and that heat which is generated, is readily dissipated without seriously affecting the power transmitting efficiency of the drive unit 10.

As illustrated in FIGURE 1, an exemplary embodiment of the improvements set forth in the present invention comprises a plurality of axially spaced alternately disposed lands 42 and grooves 44 integrally formed and extending annularly around each of the cylindrical end portions 40 of the drive pins 38. The outer periphery of each of the lands 42 is of a generally arcuate contour such that the only mutually engaging surface between the end portions 40 of the drive pins 38 and the inner periphery of the slots 36 is a plurality of annular ridges each of which is formed by one of the lands 42.

The plurality of lands 42 define a multiplicity of lubricant chambers 46 one of which is disposed within each of the grooves 44. Together with imparting a low coefficient of friction surface on the lands 42 and the inner periphery of the slots 36, the lubricant retained within the chambers 46 is adapted to readily dissipate the frictional heat generated upon reciprocation of the end portions 40 of the drive pins 38 within the slots 36.

A modification of the angular drive assembly shown in FIGURES 1 and 2 is illustrated in FIGURES 3 and 4 wherein a plurality of axially spaced lands 42e and grooves 44e are formed on the inner periphery of slots 36e rather than on driving pins 38e. With such a construction, the only engaging surfaces between the drive pins 38e and the rotor members 28e and 30e is again a plurality of thin annular ridges, each of which is interposed between a separate lubricant chamber, in a manner previously discussed.

FIGURES 5 through 9 illustrate a plurality of axially spaced annular split bearing rings 48a, 48b, 48c and 48d interposed between the adjacent surfaces of the drive pins and their associated rotor members to reduce the contact area therebetween, in a manner similar to the afore-discussed lands 42. Each of said bearing rings 48a, etc. partially defines one of a plurality of lubricant chambers 50a, etc. adapted to function in substantially the same manner as the previously mentioned lubricant chambers 46. Similar components in the various embodiments of the invention incorporating the bearing rings 48a, etc. are identified by common numerical references, but the components of each individual embodiment are designated with separate alphabetical subscripts.

Referring now to FIGURE 5, a rotor member 30a having an axially extending slot 36a is provided with a plurality of axially spaced annularly extending semi-circular grooves 52a, each of which is adapted to partially receive one of a plurality of circular-sectioned annular bearing rings 48a therewithin. Each of the bearing rings 48a, when disposed within the annular grooves 52a, has the inner periphery thereof spaced radially inward from the periphery of the slot 36a such that when the end portion 40a of the drive pin 38a is positioned within the slot 36a, the only mutually engaging area therebetween is a plurality of thin annular ridges provided by the bearing rings 48a.

A similar construction is illustrated in FIGURE 8 wherein a plurality of annular bearing rings 48b having a generally rectangular cross section are disposed one within each of a plurality of complementary shaped annular grooves 52b formed within the inner surface of an axially extending slot 36b of the rotor member 30b. As in the previously discussed assemblage a, the annular bearing rings 48b are adapted to journal the cylindrical end portion 40b of the drive pin 38b such that the outer periphery thereof engages only the inner periphery of the rings 48b thereby substantially reducing the frictional forces resisting the reciprocal motion thereof.

A further embodiment of the improvements of the present invention is illustrated in FIGURE 7 wherein a plurality of axially spaced annularly extending semi-circular grooves 52c are formed on the outer periphery of a cylindrical end portion 40c of a drive pin 38c. Each of the grooves 52c is adapted to partially receive one of a plurality of circular-sectioned annular bearing rings 48c therewithin. The bearing rings 48c, when positioned within the grooves 52c, have their outer peripheries spaced radially outward from the outer surface of the end portion 40c such that when the drive pin 38c is disposed within the slot 36c, only the annular outer edge portions of the bearing rings 48c engage the inner periphery of the slot 36c.

FIGURE 9 illustrates a construction similar to that shown in FIGURE 7 wherein the annular bearing rings 48d are of a generally rectangular cross section and serve to reduce the contact surface between the end portion 40d of the drive pin 38d and the inner periphery of the axially extending slot 36d within the rotor member 30d, in a manner similar to that set forth in the previously discussed assemblages a, b and c.

The annular bearing rings 48a, etc., illustrated herein may be made from any suitable material that is resistant to wear and is characterized by a low coefficient of friction. With such a construction, the effective operational life of both the driving pins 38 and the rotor members 28 and 30 may be prolonged due to the reduced frictional effects acting thereon.

It will be seen that each of the axially extending slots 36 is provided with straight side walls 54 which, together with the inner periphery of the sleeve bearings 24 and 26 and the outer surface of the cylindrical end portions 40 of drive pins 38, define a plurality of axially extending passages 56. The passages 56 are adapted to serve as both repositories for lubricant flowing between the lubricant chambers 46, 50 and as air vent passages allowing air to move to and from the varying volume compartments between the ends of the drive pins 38 and the adjacent ends of the slots 36. With such a construction, lubricant is permitted to freely circulate through the passages 56 and into the lubricant chambers 46, 50 thereby assuring a thorough distribution of lubricant to all of the moving parts of the drive unit 10. Furthermore, it will be noted that such a construction eliminates the necessity for the slots 36 being open at their outer ends and enables the drive unit 10 to be closed at the end portions thereof. Accordingly, the drive unit 10 may be provided with a supply of lubricant that will require only infrequent replacement thereby substantially reducing the necessity for periodic maintenance.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A device for the transmission of rotary power including a housing having a central hollow interior and a pair of angularly disposed cylindrical bearing surfaces defining rotor chambers, a pair of rotors supported one in each of said chambers, each of said rotors having a plurality of circumferentially spaced axially extending peripheral slots, a plurality of connecting rods each having a pair of cylindrical portions disposed in fixed angular relation corresponding to the angular relation of said bearing surfaces, one cylindrical portion of each of said rods being disposed in one of said axially extending slots on one of said rotors and the other cylindrical portion of each of said rods being disposed in one of said axially extending slots on the other of said rotors, bearing means comprising a plurality of axially spaced annular bearing elements extending inwardly from the inner periphery of each of said slots on said rotors and adapted to be interposed between said inner periphery of said slots and said cylindrical portions of said connecting rods, said cylindrical portions being engageable with the adjacent of said bearing surfaces, said bearing elements defining lubricant chambers therebetween adapted to supply lubricant to said slots and to said rotor chambers in providing for frictionless reciprocal movement between said connecting rods and said rotors and for frictionless rotary movement between said rotors and said rotor chambers.

2. A device for the transmission of rotary power as set forth in claim 1 wherein the periphery of each of said bearing elements extending inwardly from the inner periphery of said slots is of a relatively arcuate contour.

3. A device for the transmission of rotary power including a housing means provided with a pair of angularly disposed cylindrical bearing surfaces defining rotor chambers, a pair of rotors supported one in each of said chambers, each of said rotors having a plurality of circumferentially spaced axially extending peripheral slots, each of said slots having a portion opening into the adjacent of said rotor chambers, a plurality of connecting rods each having a pair of cylindrical portions disposed in fixed angular relation corresponding to the angular relation of said bearing surfaces, one cylindrical portion of each of said rods being disposed in one of said axially extending slots on one of said rotors and the other cylindrical portion of each of said rods being disposed in one of said axially extending slots on the other of said rotors, a plurality of annular bearing rings interposed between each of said cylindrical end portions of said connecting rods and the inner periphery of said axially extending slots on said rotors and engaging the inner periphery of the adjacent of said rotor chambers, said bearing rings defining lubricant chambers adapted to supply lubricant to said slots and to said rotor chambers in providing for frictionless reciprocal movement between said connecting rods and said rotors and for frictionless rotary movement between said rotors and said rotor chambers, and shaft means extending axially from each of said rotors.

4. A device for the transmission of rotary power including a housing having a central hollow elbow portion and sleeve portions on opposite sides of said elbow portion, a pair of rotors supported one in each of said sleeve portions, each of said rotors having a plurality of circumferentially spaced axially extending peripheral slots, each of said slots having a portion opening into the adjacent of said rotor chambers, a plurality of connecting rods extending through said elbow portion and each having a pair of angularly disposed cylindrical portions, one cylindrical portion of each connecting rod being carried in a slot of one of said rotors and the other cylindrical portion of each of said connecting rods being carried in a slot of the other of said rotors, a plurality of annular bearing rings interposed between each of said cylindrical portions and the inner periphery of said slots, a plurality of axially spaced annularly extending grooves on each of said cylindrical portions each adapted to partially receive one of said bearing rings therewithin, said bearing rings when disposed in said grooves having their outer periphery spaced radially outward from the outer periphery of said cylindrical portions thereby journaling said cylindrical portions such that the outer periphery thereof is spaced from said inner periphery of said slots, said bearing rings defining lubricant chambers therebetween adapted to supply lubricant to said slots and to said rotor chambers in providing for frictionless reciprocal movement between said connecting rods and said rotors and for frictionless rotary movement between said rotors and said rotor chambers, and each of said slots being open to said elbow portion at one end thereof and terminating in end walls at the opposite ends thereof and said slots being shaped to communicate air from the end of said slots adjacent said end walls to the interior of said elbow portion.

5. A device for the transmission of rotary power as set forth in claim 4 wherein the outer diameter of said annular bearing rings is substantially equal to the radial distance between the radial inner portion of said peripheral slots and the inner periphery of the adjacent of said sleeve portions.

6. A device for the transmission of rotary power including a housing having a central hollow elbow portion and sleeve portions on opposite sides of said elbow portion, a pair of rotors supported one in each of said sleeve portions, each of said rotors having a plurality of circumferentially spaced axially extending peripheral slots, a plurality of connecting rods extending through said elbow portion and each having a pair of angularly disposed cylindrical portions, one cylindrical portion of each connecting rod being carried in a slot of one of said rotors and the other cylindrical portion of each of said connecting rods being carried in a slot of the other of said rotors, a plurality of annular bearing rings interposed between each of said cylindrical portions and the inner periphery of said slots, a plurality of axially spaced grooves within each of said slots each adapted to partially receive one of said bearing rings therewithin, said bearing rings when disposed in said grooves having their inner periphery spaced radially inward from said inner periphery of said slots thereby journaling said cylindrical portions such that the outer peripheries thereof are spaced from said inner periphery of said slots, said bearing rings defining lubricant chambers adapted to supply lubricant to said slots and to said rotor chambers in providing for frictionless reciprocal movement between said connecting rods and said rotors and for frictionless rotary movement between said rotors and said rotor chambers, said slots being open to said elbow portion at one end thereof and terminating in end walls at the opposite ends thereof and said slots being shaped to communicate air from the end of said slots adjacent said end wall to the interior of said elbow portion.

7. A device for the transmission of rotary power including housing means provided with a pair of angularly disposed cylindrical bearing surfaces defining rotor chambers, a pair of rotors supported one in each of said chambers, each of said rotors having a plurality of circumferentially spaced axially extending peripheral slots, said slots having semi-cylindrical bottom walls at the radially inner side thereof and opposite parallel side walls extending from said bottom walls to the periphery of said rotors, a plurality of connecting rods each having a pair of cylindrical portions of circular cross section disposed in fixed angular relation corresponding to the angular relation of said bearing surfaces, one cylindrical portion of each of said connecting rods being carried in a slot of one of said rotors and the other cylindrical portion of each of said connecting rods being carried in a slot of the other of said rotors, a plurality of circular cross section annular bearing rings interposed between each of said cylindrical portions and the inner periphery of said slots, a plurality of axially spaced annularly extending semi-circular grooves on each of said cylindrical portions of said connecting rods each adapted to partially receive one of said annular bearing rings therewithin, said bearing rings when disposed in said grooves having their outer periphery spaced radially outward from said cylindrical portions and conformingly engaging said semi-cylindrical walls of the grooves in which said cylindrical portions are disposed, said bearing rings defining lubricant chambers adapted to supply lubricant to said slots and to said rotor chambers in providing for frictionless reciprocal movement between said connecting rods and said rotors and for frictionless rotary movement between said rotors and said rotor chambers.

8. A device for the transmission of rotary power as set forth in claim 7 wherein said axially spaced annularly extending grooves and said annular bearing rings are of a generally rectangular cross section.

9. A device for the transmission of rotary power including housing means provided with a pair of angularly disposed cylindrical bearing surfaces defining rotor chambers, a pair of rotors supported one in each of said chambers, each of said rotors having a plurality of circumferentially spaced axially extending peripheral slots, said slots having semi-cylindrical bottom walls at the radially inner side thereof and opposite parallel side walls extending from said bottom walls to the periphery of said rotors, a plurality of connecting rods each having a pair of cylindrical portions of circular cross section disposed in fixed angular relation corresponding to the angular relation of said bearing surfaces, one cylindrical portion of each connecting rod being carried in a slot of one of said rotors and the other cylindrical portion of each connecting rod being carried in a slot of the other of said rotors, a plurality of circular cross section annular bearing rings interposed between each of said cylindrical portions and the inner periphery of said slots, a plurality of semi-circular axially spaced grooves within each of said slots each adapted to partially receive one of said bearing rings therewithin, said bearing rings when disposed in said grooves having their inner periphery spaced radially inward from said inner periphery of said slots thereby journaling said cylindrical portions such that the outer periphery thereof is spaced from said inner periphery of said slots said bearing rings defining lubricant chambers adapted to supply lubricant to said slots and to said rotor chambers in providing for frictionless reciprocal movement between said connecting rods and said rotors and for said frictionless rotary movement between said rotors and said rotor chambers.

10. A device for the transmission of rotary power as set forth in claim 9 wherein said axially spaced annularly extending grooves and said annular bearing rings are of a generally rectangular cross section.

References Cited by the Examiner
UNITED STATES PATENTS

| | | | |
|---|---|---|---|
| 198,391 | 12/1877 | Jamieson | 184—18 |
| 296,462 | 4/1884 | Ruff | 184—18 |
| 1,119,514 | 12/1914 | Jonsson | 64—20 |
| 1,292,312 | 1/1919 | Gronkwist | 184—18 |
| 1,300,623 | 4/1919 | Kistner | 277—215 |
| 2,022,909 | 12/1935 | Glen | 64—20 |
| 2,543,134 | 2/1951 | Smith et al. | 64—20 |
| 2,618,264 | 11/1952 | Bloxsom | 184—18 |
| 3,103,799 | 9/1963 | Berna | 64—20 |
| 3,177,683 | 4/1965 | Olson | 64—2 |

FRED C. MATTERN, JR., *Primary Examiner.*

BROUGHTON G. DURHAM, MILTON KAUFMAN, *Examiners.*

H. C. COE, *Assistant Examiner.*